US012688087B2

(12) United States Patent
Iam et al.

(10) Patent No.: US 12,688,087 B2
(45) Date of Patent: Jul. 21, 2026

(54) PROBABLISTICALLY DETERMINING MEMORY PORTIONS FOR SELECT GATE SCANNING

(71) Applicant: Micron Technology, Inc., Boise, ID (US)

(72) Inventors: Luis Iam, San Jose, CA (US); Zhengang Chen, San Jose, CA (US); Tawalin Opastrakoon, Boise, ID (US); Fanqi Wu, Sunnyvale, CA (US); Juane Li, San Jose, CA (US); Aaron Lee, Sunnyvale, CA (US); Lei Lin, Fremont, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 37 days.

(21) Appl. No.: 18/790,947

(22) Filed: Jul. 31, 2024

(65) Prior Publication Data

US 2026/0037370 A1 Feb. 5, 2026

(51) Int. Cl.
*G06F 11/10* (2006.01)

(52) U.S. Cl.
CPC ...... *G06F 11/1016* (2013.01); *G06F 11/1068* (2013.01)

(58) Field of Classification Search
CPC .......................... G06F 11/1016; G06F 11/1068
USPC ......................................................... 714/764
See application file for complete search history.

(56) References Cited

U.S. PATENT DOCUMENTS

| | | | |
|---|---|---|---|
| 8,443,261 B2 * | 5/2013 | Waldspurger ........... | G06F 11/08 714/764 |
| 8,856,500 B2 * | 10/2014 | Vauclair ................... | G06F 9/32 712/245 |
| 11,687,410 B2 * | 6/2023 | Rooney .................. | G11C 29/42 714/764 |
| 2010/0313077 A1 | 12/2010 | Radke et al. | |
| 2015/0301763 A1 | 10/2015 | Shaharabany et al. | |
| 2015/0378912 A1 * | 12/2015 | Gschwind ........... | G06F 12/0842 711/130 |
| 2020/0027519 A1 | 1/2020 | Zhang et al. | |
| 2020/0210259 A1 | 7/2020 | Hoei et al. | |
| 2023/0176747 A1 | 6/2023 | Mirichigni et al. | |
| 2024/0071491 A1 * | 2/2024 | Lu ...................... | G11C 13/0035 |

FOREIGN PATENT DOCUMENTS

| | | | | |
|---|---|---|---|---|
| JP | 5085939 B2 * | 11/2012 | ............. | G11C 16/26 |
| KR | 20180021812 A * | 3/2018 | ........... | G06F 9/3824 |

OTHER PUBLICATIONS

International Search Report and Written Opinion, PCT App. No. PCT/US2025/039533, Nov. 25, 2025, 08 pages.

* cited by examiner

*Primary Examiner* — Albert Decady
*Assistant Examiner* — Enam Ahmed
(74) *Attorney, Agent, or Firm* — NICHOLSON DE VOS WEBSTER & ELLIOTT LLP

(57) ABSTRACT

Methods, systems, and apparatuses include probabilistically determining a read operation number using a window size. A read command is received from a host device by a memory subsystem. A memory address is determined using the read command. It is determined that the read command corresponds to the read operation number. The memory address is flagged to have a select gate of the memory address scanned. The select gate of the memory address is scanned in response to flagging the memory address.

20 Claims, 6 Drawing Sheets

400

RECEIVE ERASE COMMAND FROM HOST DEVICE
405

DETERMINE MEMORY ADDRESS USING ERASE
COMMAND
410

MEMORY ADDRESS FLAGGED FOR SELECT
GATE SCAN?
415

PERFORM SELECT GATE SCAN
ON MEMORY ADDRESS
420

MEMORY ADDRESS PASSED SELECT GATE
SCAN?
425

RETIRE MEMORY ADDRESS
430

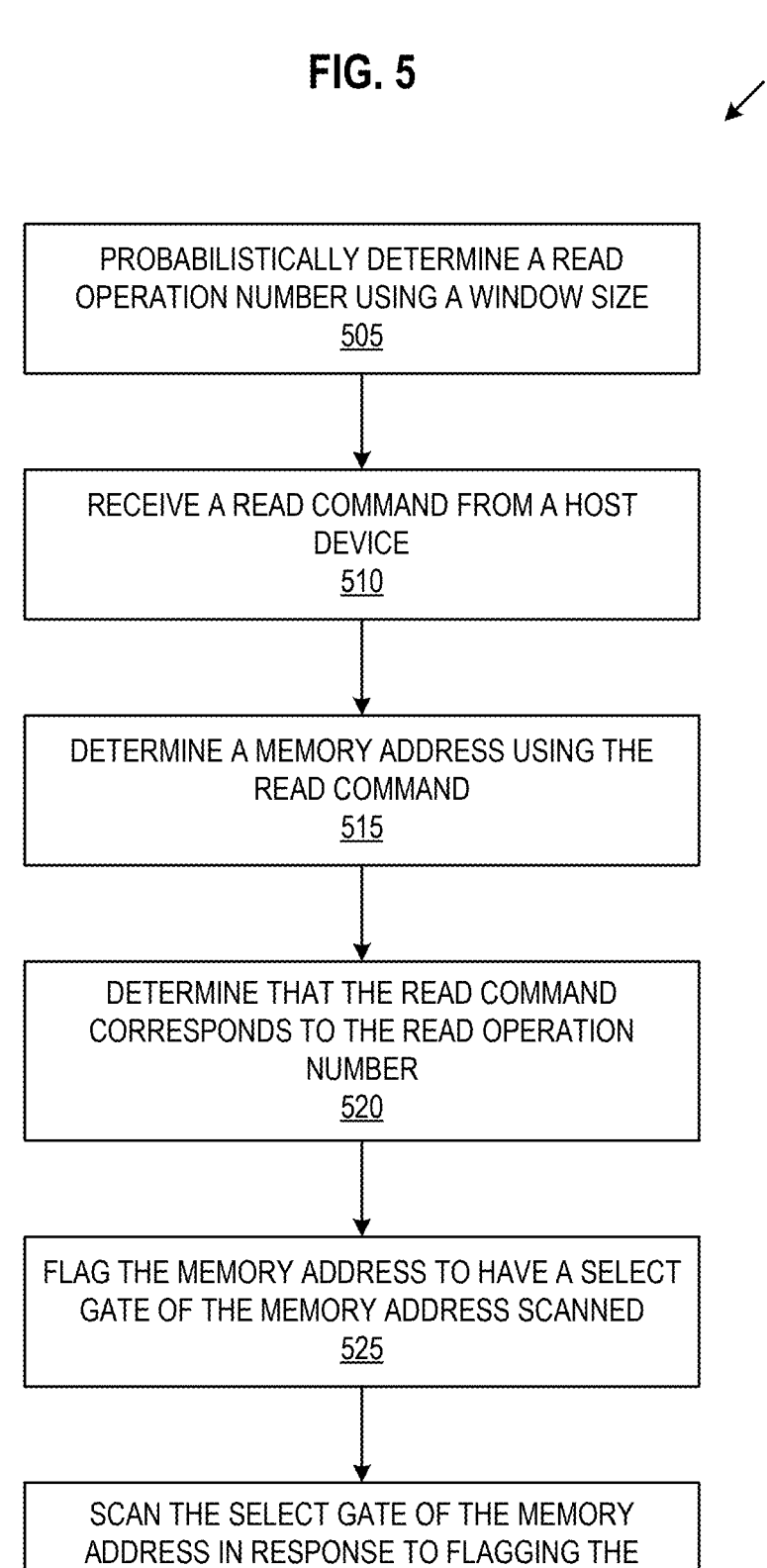

PROBABILISTICALLY DETERMINE A READ
OPERATION NUMBER USING A WINDOW SIZE
505

RECEIVE A READ COMMAND FROM A HOST
DEVICE
510

DETERMINE A MEMORY ADDRESS USING THE
READ COMMAND
515

DETERMINE THAT THE READ COMMAND
CORRESPONDS TO THE READ OPERATION
NUMBER
520

FLAG THE MEMORY ADDRESS TO HAVE A SELECT
GATE OF THE MEMORY ADDRESS SCANNED
525

SCAN THE SELECT GATE OF THE MEMORY
ADDRESS IN RESPONSE TO FLAGGING THE
MEMORY ADDRESS
530

600

PROBABLISTICALLY DETERMINING MEMORY PORTIONS FOR SELECT GATE SCANNING

TECHNICAL FIELD

The present disclosure generally relates to scanning memory for data reliability, and more specifically, relates to probabilistically determining memory portions for select gate scanning.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 5 is another flow diagram of an example method to probabilistically determine memory portions for select gate scanning in accordance with some embodiments of the present disclosure.

DETAILED DESCRIPTION

Figure 1:
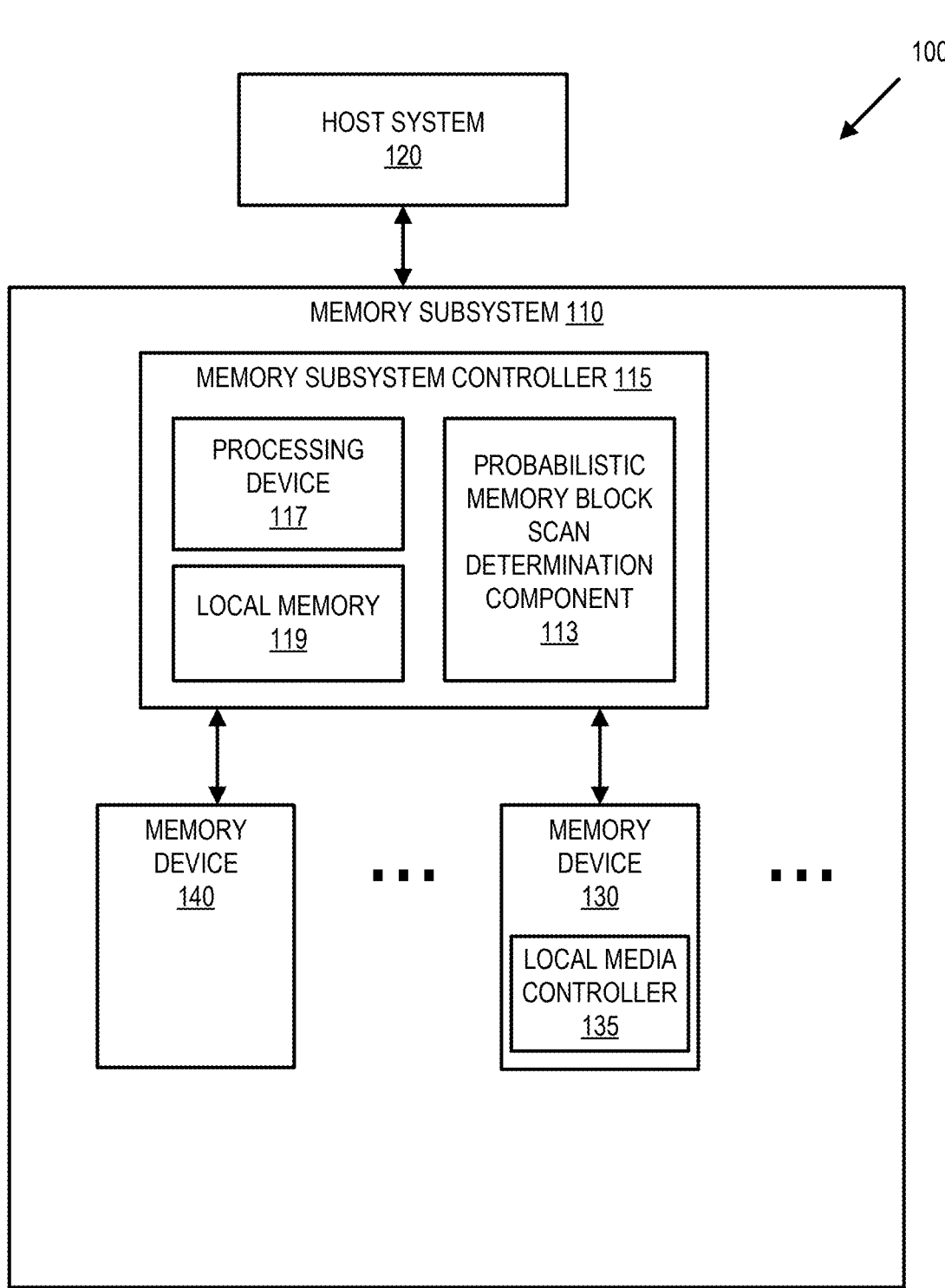
FIG. 1 illustrates an example computing system that includes a memory subsystem in accordance with some embodiments of the present disclosure.

Aspects of the present disclosure are directed to probabilistically determining memory portions for select gate scanning in a memory subsystem. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die can consist of one or more planes. Planes can be grouped into logic units identified by a logical unit number (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple-level cells (TLCs), quad-level cells (QLCs), and penta-level cells (PLCs). For example, an SLC can store one bit of information and has two logic states while a QLC can store sixteen bits of information and has sixteen logic states.

In conventional memory systems, memory devices use select gates to determine the data that is to be read, written, and/or erased. These conventional memory systems operate select gates by applying a threshold voltage (Vt) to the select gate. Over time, however, this threshold voltage can shift out of the optimal range, resulting in performance and/or reliability issues. For example, threshold voltages that are outside of the optimal range can result in incorrect data being read or the inability to read data from portions of the memory device. Conventional memory systems can perform periodic scans on portions of the memory device based on the read count for those portions. Accordingly, these systems determine whether the threshold voltage has shifted and retire memory portions if the threshold voltage has shifted outside of the optimal range. Tracking the read count for all these portions of memory, however, takes a significant amount of space on the memory device, which can impact user performance. For example, the memory subsystem consumes time and resources (e.g., memory space) to track and record the memory portion read counts. This results in less free memory and increased latency for the memory device.

Aspects of the present disclosure address the above and other deficiencies by probabilistically determining memory portions for select gate scanning. The memory subsystem can generate a random number within a window size and select a read operation of a set of read operations within that window. By flagging the memory portion associated with the random number to be scanned, the memory subsystem can ensure that select gates are scanned without wasting resources by maintaining read counts for all memory portions. Using the flag, the memory subsystem can perform the select gate scan on the memory portion once the memory portion is erased and retire the memory portion if it fails the scan. Furthermore, the memory system can also take advantage of existing counters, such as probabilistic read disturb handling counters, and trigger the selection and flagging of a memory portion using the existing probabilistic read disturb handling counters. Accordingly, the memory system can further reduce memory device latency and increase available memory.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and a memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IOT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processing device such as a processor chipset and a software stack executed by the processor chipset. The processor chipset can include one or more cores, one or more caches, a memory controller (e.g., NVDIMM controller), and/or a storage protocol controller (e.g., a peripheral component interconnect express (PCIe) controller, a serial advanced technology attachment (SATA) controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a SATA interface, including a mini-SATA (mSATA) interface, a PCIe interface, including a mini PCIe (mPCIE) interface, a Non-Volatile Memory Express (NVMe) interface, a universal serial bus (USB) interface, an a Fibre Channel, Serial Attached SCSI (SAS), a Small Computer System Interface (SCSI), a double data rate (DDR) memory bus, a dual in-line memory module (DIMM) interface (e.g., DIMM socket interface that supports Double Data Rate (DDR)), an Advanced Host Controller (AHCI) interface, an Open NAND Flash Interface (ONFI) interface, a Double Data Rate (DDR) interface, a Low Power Double Data Rate (LPDDR) interface, any other interface, and/or combinations of these interfaces. The physical host interface can be used to transmit data between the host system 120 and the memory subsystem 110. The host system 120 can further utilize an NVMe interface to access components (e.g., memory devices 130 and 140) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via the same communication connection, multiple separate communication connections, and/or a combination of communication connections.

The memory devices 130 and 140 can include any combination of the different types of non-volatile memory devices and/or volatile memory devices. The volatile memory devices (e.g., memory device 140) can be, but are not limited to, random-access memory (RAM), such as dynamic random-access memory (DRAM), synchronous dynamic random-access memory (SDRAM), video random-access memory (VRAM), and cache memory.

Some examples of non-volatile memory devices (e.g., memory device 130) include negative-and (NAND) type flash memory devices and write-in-place type memory devices, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random-access memory (FeRAM), magneto random-access memory (MRAM), Spin Transfer Torque (STT)-MRAM, nano-RAM (NRAM), silicon-oxide-nitride-oxide-silicon (SONOS) memory, conductive bridging RAM (CBRAM), resistive random-access memory (RRAM), oxide based RRAM (OxRAM), negative-or (NOR) flash memory, and erasable programmable read-only memory (EPROM), including electrically erasable programmable read-only memory (EE-PROM).

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The buffer memory of subsystem controller 115 can include any of the volatile or non-volatile memory types mentioned above including combinations thereof. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in memory subsystem 110 (e.g., stored in a local memory 119). In some examples, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processing device or controller separate from the memory subsystem 110).

In general, the memory subsystem controller 115 can receive commands or operations from the host system 120 and can convert the commands or operations into instructions or appropriate commands to achieve the desired access to the memory devices (e.g., memory devices 130 and/or 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA) and/or namespace) and a physical address (e.g., physical block address) that are associated with the memory devices (e.g., memory devices 130 and/or 140). The memory subsystem controller 115 can further include host interface circuitry to communicate with the host system 120 via the physical host interface. The host interface circuitry can convert the commands received from the host system into command instructions to access the memory devices (e.g., memory devices 130 and/or 140) as well as convert responses associated with the memory devices into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices (e.g., memory devices 130 and/or 140).

In some embodiments, the memory devices (e.g., memory devices 130 and/or 140) include local media controllers 135 that operate in conjunction with memory subsystem controller 115 to execute operations on one or more memory cells of the memory devices (e.g., memory devices 130 and/or 140). An external controller (e.g., memory subsystem controller 115) can externally manage the memory devices (e.g., perform media management operations on the memory devices 130 and/or 140). In some embodiments, a memory device (e.g., memory device 130) is a managed memory device, which is a raw memory device combined with a local controller (e.g., local controller 135) for media management within the same memory device package. An example of a managed memory device is a managed NAND (MNAND) device.

The memory subsystem 110 includes a probabilistic memory block scan determination component 113 that flags memory portions for select gate scanning and performs the select gate scan. In some embodiments, the controller 115 includes at least a portion of the probabilistic memory block scan determination component 113. For example, the controller 115 can include a processing device 117 configured to execute instructions stored in local memory 119 for performing the operations described herein. In some embodiments, a probabilistic memory block scan determination component 113 is part of the host system 120, an application, or an operating system.

The probabilistic memory block scan determination component 113 probabilistically determines memory portions to scan using a window size and flags the memory portions for select gate scanning, e.g., once the memory portions are erased. Further details with regards to the operations of the probabilistic memory block scan determination component 113 are described below.

Figure 2:
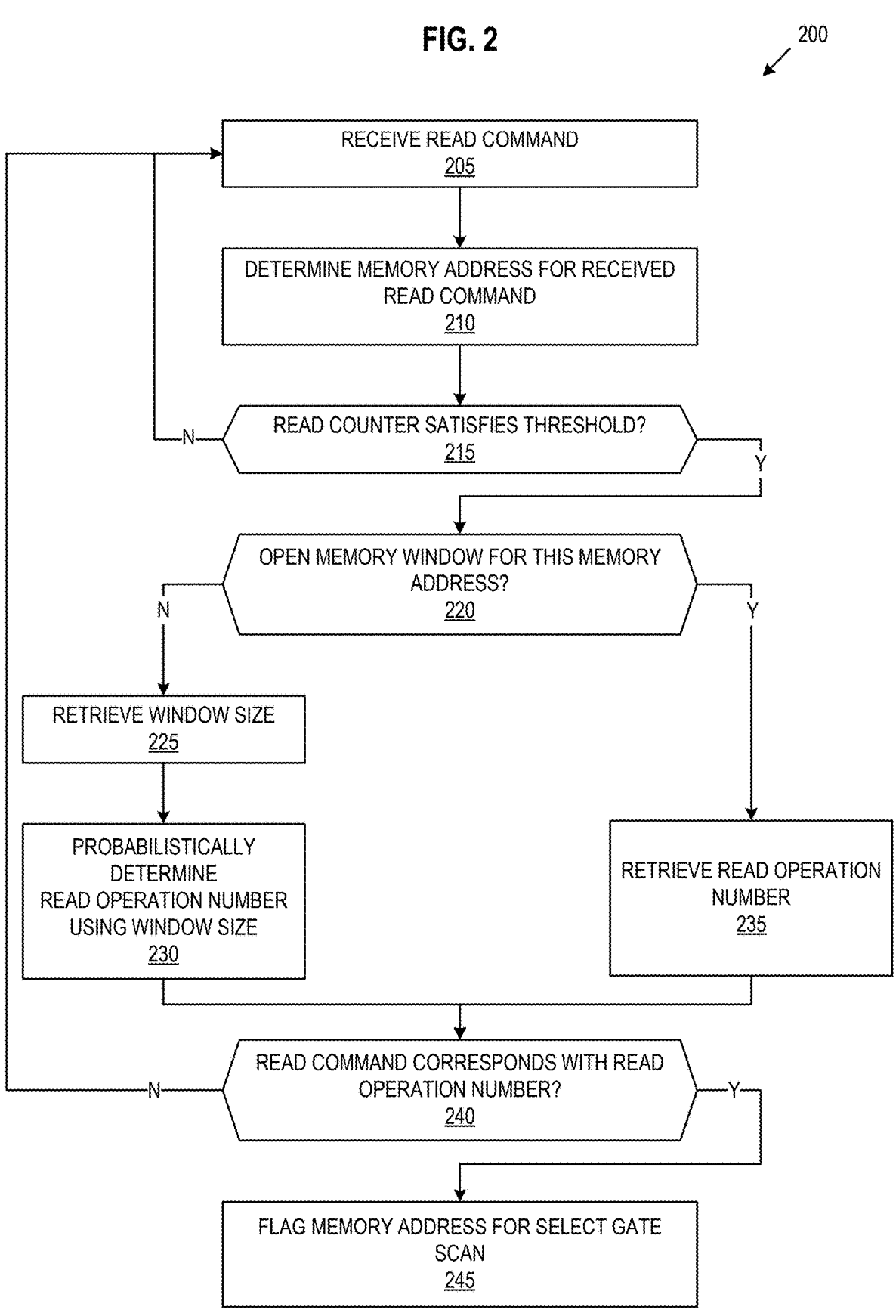
FIG. 2 is a flow diagram of an example method to probabilistically determine memory portions for select gate scanning in accordance with some embodiments of the present disclosure.

FIG. 2 is a flow diagram of an example method to probabilistically determine memory portions for select gate scanning in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the probabilistic memory block scan determination component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 205, the processing device receives a read command from a host device. For example, probabilistic memory block scan determination component 113 receives a read command from host system 120 to read data from a memory device (e.g., memory device 130). In some embodiments, the processing device updates a read count in response to receiving the read command. For example, probabilistic memory block scan determination component 113 updates a read count for memory device 130 and/or a memory die to which the read command is directed.

At operation 210, the processing device determines a memory address for the received read command. For example, the read command includes a logical address identifying a memory portion of a memory device (e.g., memory device 130 of FIG. 1). In some embodiments, probabilistic memory block scan determination component 113 receives the read command including the logical address and translates the logical address into a physical address for a portion of the memory device. For example, probabilistic memory block scan determination component 113 uses a look-up table or similar method to determine a physical address for a memory block that corresponds with the received logical address.

At operation 215, the processing device determines whether the read counter satisfies a threshold number of read operations. For example, probabilistic memory block scan determination component 113 determines whether a read counter for a memory die and/or a memory device (e.g., memory device 130 of FIG. 1) associated with the memory block meets or exceeds the threshold. Checking to make sure the read counter for the memory die and/or memory device satisfies a threshold before scanning prevents probabilistic memory block scan determination component 113 from prematurely performing a scan before the select gate voltage threshold has significantly shifted. If the processing device determines that the read counter satisfies the threshold, the method 200 proceeds to operation 220. If the processing device determines that the read counter does not satisfy the threshold, the method 200 returns to operation 205.

At operation 220, the processing device determines whether there is an open memory window for this memory address. For example, probabilistic memory block scan determination component 113 uses a look-up table to determine whether there is a read operation number/count for the memory block to which the determined memory address belongs. In such an example, probabilistic memory block scan determination component 113 determines that there is an open memory window if there is an associated read operation number and determines that there is not an open memory window if there is no associated read operation number.

If the processing device determines that there is an open memory window for the determined memory address, the method 200 proceeds to operation 235. If the processing device determines that there is not an open memory window for the determined memory address, the method 200 proceeds to operation 225.

At operation 225, the processing device retrieves a window size. For example, probabilistic memory block scan determination component 113 retrieves a window size from local memory (e.g., local memory 119 of FIG. 1). In one embodiment, the window size is a predetermined value, e.g., one thousand read operations. In some embodiments, the window size is based on the read count for the memory die and/or memory device. For example, probabilistic memory block scan determination component 113 can decrease or otherwise update the window size using the read count. In one embodiment, probabilistic memory block scan determination component 113 updates the window size in response to the read count for the memory die and/or memory device reaching a threshold.

At operation 230, the processing device probabilistically determines a read operation number using the window size. For example, probabilistic memory block scan determination component 113 generates a uniform random number between one and the window size (e.g., less than or equal to the window size). In some embodiments, the processing device generates a read operation number for a memory portion of the memory device. For example, probabilistic memory block scan determination component 113 generates a uniform random number for the memory block (e.g., each logical unit) associated with the logical address for the first read command. In some embodiments, the processing device stores the read operation number. For example, probabilistic memory block scan determination component 113 stores the read operation number in a look-up table along with the memory block to which the determined memory address belongs.

At operation 235, the processing device retrieves a read operation number. For example, probabilistic memory block scan determination component 113 uses a look-up table and retrieves the read operation number associated with the memory block to which the determined memory address belongs.

At operation 240, the processing device determines whether the read command corresponds with the read operation number. For example, probabilistic memory block scan determination component 113 determines whether a counter for the number of read operations received for the memory block is equal to the retrieved and/or determined read operation number. If the processing device determines that the read command corresponds with the read operation number, the method 200 proceeds to operation 245. If the processing device determines that the read command does not correspond with the read operation number, the method 200 returns to operation 205.

At operation 245, the processing device flags the memory address for a select gate scan. For example, probabilistic memory block scan determination component 113 flags the memory block associated with the determined memory address in a look-up table. In some embodiments, the processing device stores the look-up table with the flagged memory address. For example, probabilistic memory block scan determination component 113 stores the look-up table in local memory (e.g., local memory 119 of FIG. 1). In some embodiments, the processing device performs select gate scans on the flagged memory address when the memory address is erased. Further details regarding performing the select gate scan are described with reference to FIGS. 3 and 4.

Figure 3:
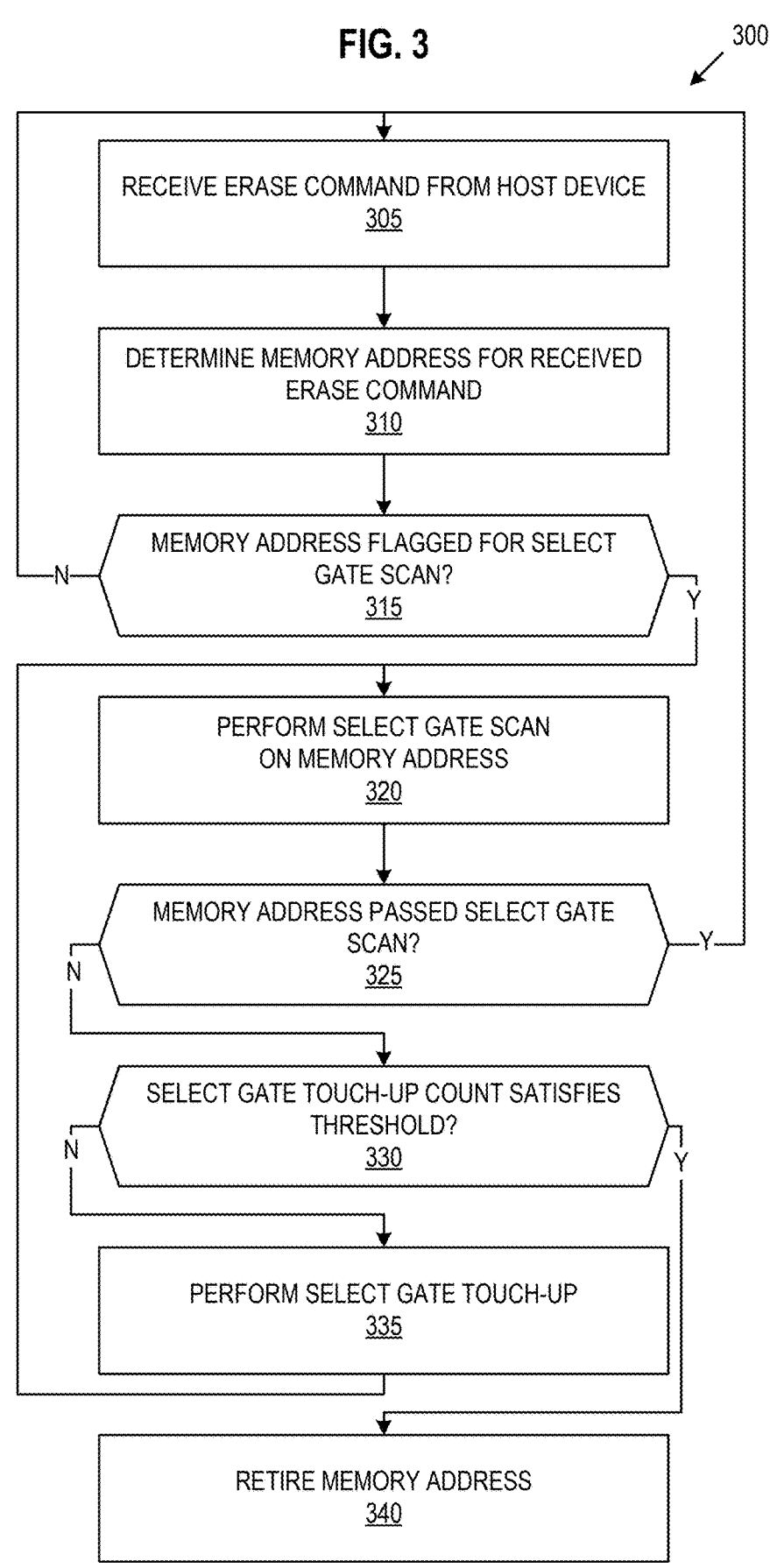
FIG. 3 is a flow diagram of an example method to perform select gate scanning on probabilistically determined memory portions in accordance with some embodiments of the present disclosure.

FIG. 3 is a flow diagram of an example method to perform select gate scanning on probabilistically determined memory portions in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the probabilistic memory block scan determination component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the processing device receives an erase command from a host device. For example, probabilistic memory block scan determination component 113 receives an erase command from host system 120 to erase data stored in a memory device (e.g., memory device 130).

At operation 310, the processing device determines a memory address for the received erase command. For example, the erase command includes a logical address identifying a memory portion of a memory device (e.g., memory device 130 of FIG. 1). In some embodiments, probabilistic memory block scan determination component 113 receives the erase command including the logical address and translates the logical address into a physical address for a portion of the memory device. For example, probabilistic memory block scan determination component 113 uses a look-up table or similar method to determine a physical address for a memory block that corresponds with the received logical address.

At operation 315, the processing device determines whether the memory address is flagged for a select gate scan. For example, probabilistic memory block scan determination component 113 retrieves a look-up table from local memory 119 and uses the determined memory address to check whether the memory address is flagged for a select gate scan. If the processing device determines that the memory address is flagged for select gate scan, the method 300 proceeds to operation 320. If the processing device determines that the memory address is not flagged for select gate scan, the method 300 returns to operation 305.

At operation 320, the processing device performs a select gate scan on the memory address. For example, probabilistic memory block scan determination component 113 performs an erase operation on the memory address. After performing the erase operation, probabilistic memory block scan determination component 113 performs a scan on the threshold voltage for the select gate of the determined memory address. In some embodiments, for source-side select gates, the processing device performs a scan at the bottom of the voltage threshold distribution and at the top of the voltage threshold distribution. For example, probabilistic memory block scan determination component 113 retrieves a bottom threshold voltage corresponding to a bottom percentile of a threshold voltage distribution for the memory address and retrieves a top threshold voltage corresponding to a top percentile of a threshold voltage distribution for the memory address. Probabilistic memory block scan determination component 113 performs the select gate scan by applying these retrieved voltages to the memory address and determining whether the threshold voltage for the determined memory address is greater than or less than the retrieved voltages.

At operation 325, the processing device determines whether the memory address passed the select gate scan. For example, if the processing device determines that the voltage threshold for the determined memory address is greater than the voltage at the top of the distribution, the processing device determines that the memory address did not pass the select gate scan. Similarly, if the processing device determines that the voltage threshold for the determined memory address is less than the voltage at the bottom of the distribution, the processing device determines that the memory address did not pass the select gate scan. If the processing device determines that the voltage threshold for the determined memory address is between the voltage at the top of the distribution and the voltage at the bottom of the distribution, the processing device determines that memory address passed the select gate scan. If the processing device determines that the memory address passed the select gate scan, the method 300 returns to operation 305. If the processing device determines that the memory address did not pass the select gate scan, the method 300 proceeds to operation 330.

At operation 330, the processing device determines whether the select gate touch-up count satisfies a threshold. For example, probabilistic memory block scan determination component 113 determines whether the select gate corresponding with the determined memory address has been previously touched up a threshold number of times. In some embodiments, the processing device retrieves a select gate touch-up count from memory (e.g., local memory 119 of FIG. 1). If the processing device determines that the select gate touch-up count satisfies the threshold, the method 300 proceeds to operation 340. If the processing device determines that the select gate touch-up count does not satisfy the threshold, the method 300 proceeds to operation 335.

At operation 335, the processing device performs a select gate touch-up. For example, probabilistic memory block scan determination component 113 performs a source-side select gate touch-up operation to attempt to restore the threshold voltage to a normal range and prevent retirement of the memory block. In some embodiments, the processing device performs a source-side select gate touch-up operation by reprogramming the source-side select gate at the memory address, thereby updating the threshold voltage. In some embodiments, the processing device rescans the select gate of the memory address in response to performing the select gate touch-up. For example, the processing device increments the select gate touch-up count and the method 300 returns to operation 320.

At operation 340, the processing device retires the memory address. For example, probabilistic memory block scan determination component 113 adds the memory block associated with the determined memory address to a table of retired memory blocks so that the memory block is not used for future memory operations.

Figure 4:
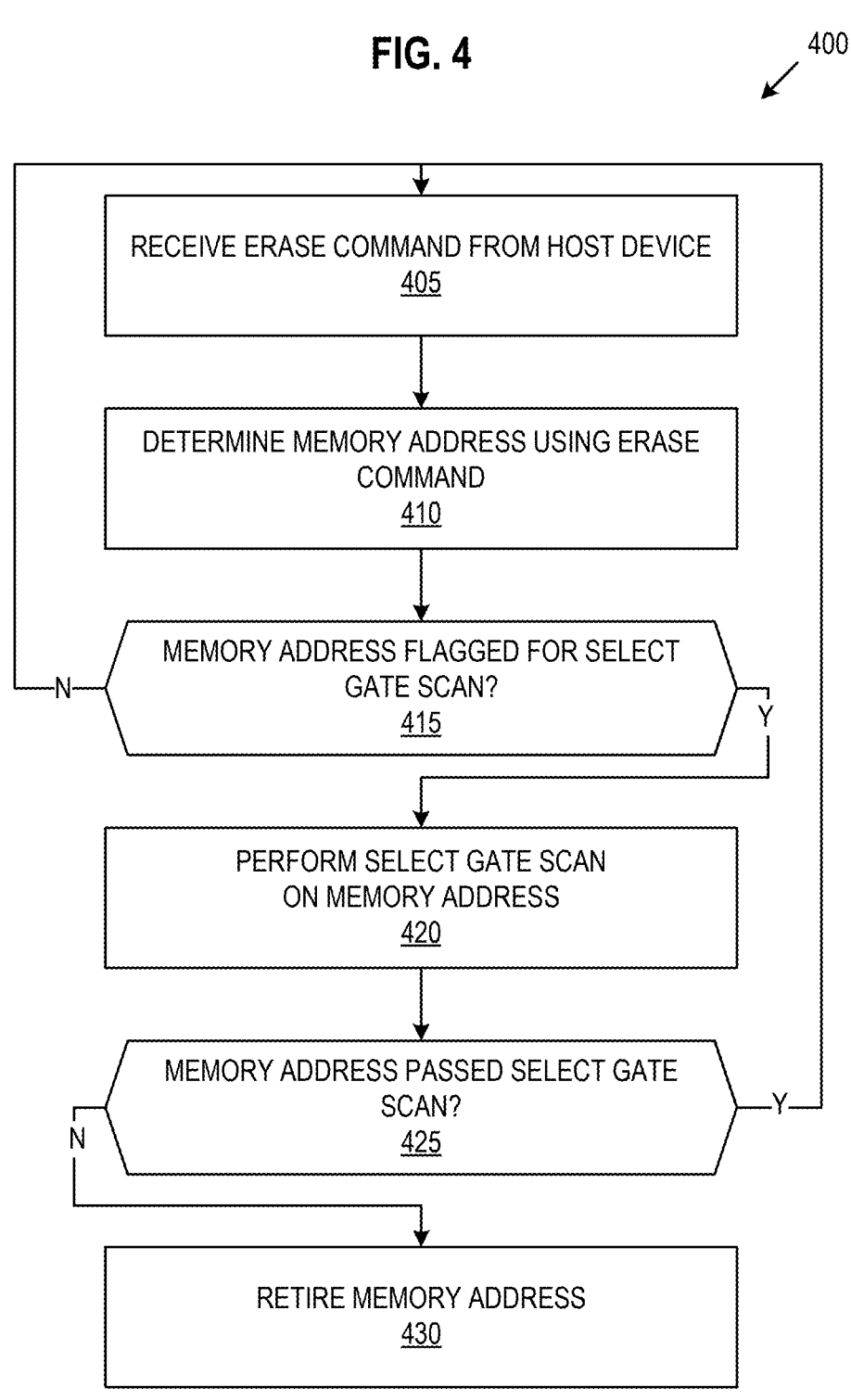
FIG. 4 is another flow diagram of an example method to perform select gate scanning on probabilistically determined memory portions in accordance with some embodiments of the present disclosure.

FIG. 4 is another flow diagram of an example method to perform select gate scanning on probabilistically determined memory portions in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the probabilistic memory block scan determination component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing device receives an erase command from a host device. For example, probabilistic memory block scan determination component 113 receives an erase command from host system 120 to erase a memory portion of a memory device (e.g., memory device 130).

At operation 410, the processing device determines a memory address using the erase command. For example, probabilistic memory block scan determination component 113 determines a memory address using the received erase command. Further details regarding determining a memory address using the erase command are discussed with reference to FIG. 3.

At operation 415, the processing device determines whether the memory address is flagged for a select gate scan. For example, probabilistic memory block scan determination component 113 retrieves a look-up table and determines whether the determined memory address is flagged in the look-up table. Further details regarding determining whether the memory address is flagged for a select gate scan are discussed with reference to FIG. 3. If the processing device determines that the memory address is flagged for select gate scan, the method 400 proceeds to operation 420. If the processing device determines that the memory address is not flagged for select gate scan, the method 400 returns to operation 405.

At operation 420, the processing device performs a select gate scan on the memory address. For example, probabilistic memory block scan determination component 113 performs an erase operation on the memory address. After performing the erase operation, probabilistic memory block scan determination component 113 performs a scan on the threshold voltage for the select gate of the determined memory address. In some embodiments, for drain-side select gates, the processing device performs a scan only at the top of the voltage threshold distribution. For example, probabilistic memory block scan determination component 113 retrieves a top threshold voltage corresponding to a top percentile of a threshold voltage distribution for the memory address. Probabilistic memory block scan determination component 113 performs the select gate scan by applying the retrieved top threshold voltage to the memory address and determining whether the threshold voltage for the determined memory address is greater than the retrieved top threshold voltage.

At operation 425, the processing device determines whether the memory address passed the select gate scan. For example, if the processing device determines that the voltage threshold for the determined memory address is greater than the voltage at the top of the distribution, the processing device determines that the memory address did not pass the select gate scan. If the processing device determines that the voltage threshold for the determined memory address is not greater than the voltage at the top of the distribution, the processing device determines that memory address passed the select gate scan. If the processing device determines that the memory address passed the select gate scan, the method 400 returns to operation 405. If the processing device determines that the memory address did not pass the select gate scan, the method 400 proceeds to operation 430.

At operation 430, the processing device retires the memory address. For example, probabilistic memory block scan determination component 113 adds the memory block associated with the determined memory address to a table of retired memory blocks so that the memory block is not used for future memory operations.

FIG. 5 is another flow diagram of an example method to perform select gate scanning on probabilistically determined memory portions in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the probabilistic memory block scan determination component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, the processing device probabilistically determines a read operation number using a window size. For example, probabilistic memory block scan determination component 113 generates a random number between one and the window size for a memory portion (e.g., memory block). Further details regarding probabilistically determining a read operation number using a window size are discussed with reference to FIG. 2.

At operation 510, the processing device receives a read command from a host device. For example, probabilistic memory block scan determination component 113 receives a read command from host system 120 to read a memory portion of a memory device (e.g., memory device 130).

At operation 515, the processing device determines a memory address using the read command. For example, probabilistic memory block scan determination component 113 determines a memory address using a logical address of the received read command. Further details regarding determining a memory address using the read command are discussed with reference to FIG. 2.

At operation 520, the processing device determines that the read command corresponds to the read operation number. For example, probabilistic memory block scan determination component 113 determines that the read count for the memory block associated with the determined memory address is equal to the probabilistically determined read operation number. Further details regarding determining that the read command corresponds to the read operation number are discussed with reference to FIG. 2.

At operation 525, the processing device flags the memory address to have a select gate of the memory address scanned. For example, probabilistic memory block scan determination component 113 stores the memory address in a look-up table or another data structure. Further details regarding flagging the memory address to have a select gate of the memory address scanned are discussed with reference to FIG. 2.

At operation 530, the processing device scans the select gate of the memory address in response to flagging the memory address. For example, after receiving and executing an erase operation from host system 120, probabilistic memory block scan determination component 113 checks whether the memory address is flagged for a select gate scan. If the memory address is flagged for a select gate scan, probabilistic memory block scan determination component 113 performs a select gate scan. In one embodiment, probabilistic memory block scan determination component 113 performs a select gate scan according to whether the memory device to which the memory address belongs is a source-side select gate memory device or a drain-side select gate memory device. Further details regarding scanning the select gate for a source-side select gate memory device are discussed with reference to FIG. 3. Further details regarding scanning the select gate for a drain-side select gate memory device are discussed with reference to FIG. 4.

Figure 6:
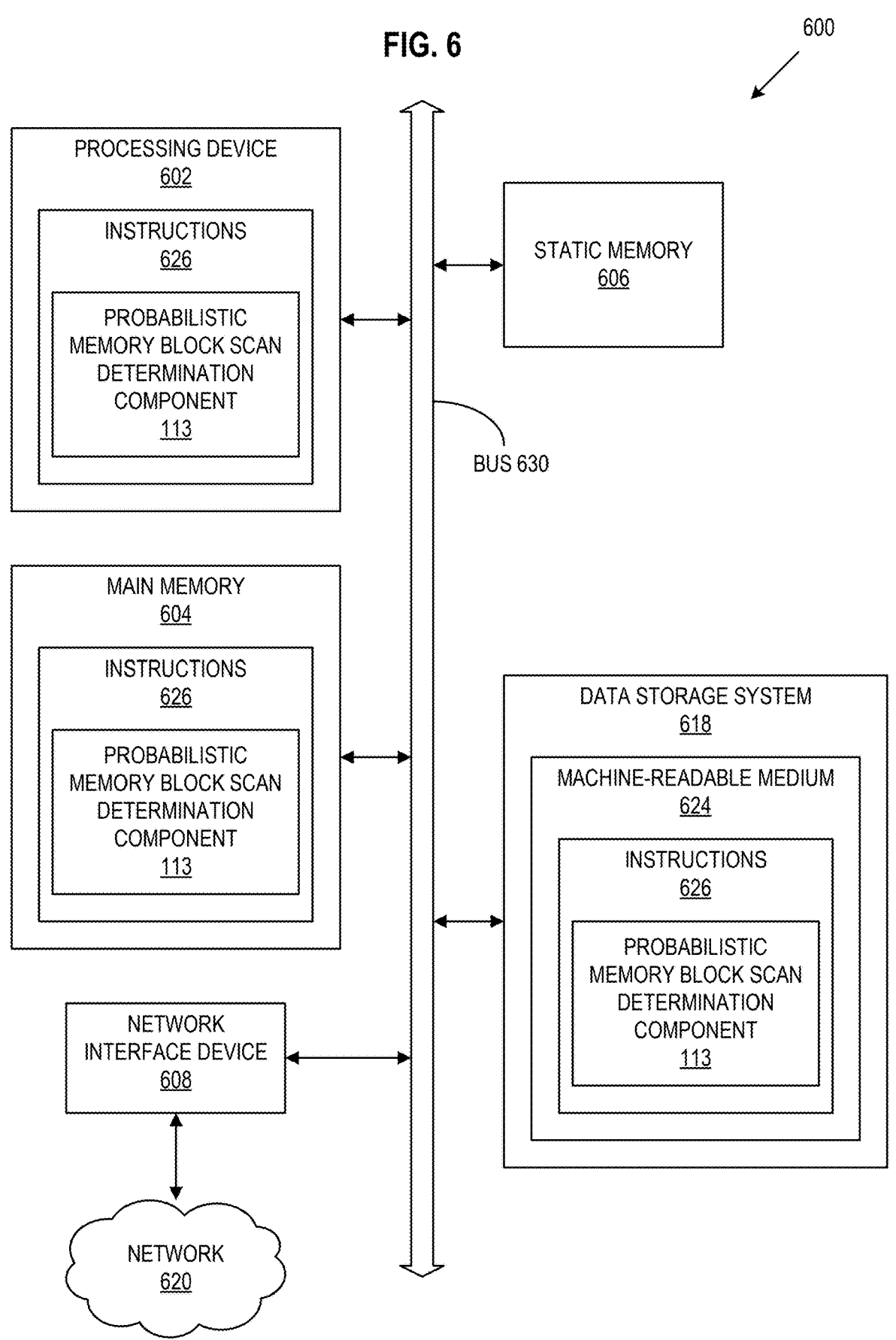
FIG. 6 is a block diagram of an example computer system in which embodiments of the present disclosure may operate.

FIG. 6 illustrates an example machine of a computer system 600 within which a set of instructions for causing the machine to perform any one or more of the methodologies discussed herein can be executed. In some embodiments, the computer system 600 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the probabilistic memory block scan determination component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a smart device, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random-access memory (DRAM) such as synchronous DRAM (SDRAM) or Rambus DRAM (RDRAM), etc.), a static memory 606 (e.g., flash memory, static random-access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626, constituting machine-readable storage media, can also reside, completely or at least partially, within the main memory 604 and/or within the processing device 602 during execution thereof by the computer system 600, the main memory 604 and the processing device 602. The machine-readable storage medium 624, data storage system 618, and/or main memory 604 can correspond to the memory subsystem 10 of FIG. 1.

In one embodiment, the instructions 626 include instructions to implement functionality corresponding to a probabilistic memory block scan determination component (e.g., probabilistic memory block scan determination component 113 of FIG. 1). While the machine-readable storage medium 624 is shown in an example embodiment to be a single medium, the term "machine-readable storage medium" should be taken to include a single medium or multiple media that store the one or more sets of instructions (e.g., instructions 626). The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 200, 300, 400, and 500 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random-access memories (RAMs), EPROMS, EEPROMs, magnetic or optical cards, or any type of media suitable for storing electronic instructions coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   retrieving a read disturb scan counter;

determining that the read disturb scan counter satisfies a read disturb scan threshold;

probabilistically determining a read operation number using a read operation window size in response to determining that the read disturb scan counter satisfies the read disturb scan threshold, wherein the read operation number is less than or equal to the read operation window size;

receiving, by a memory subsystem, a read command from a host device;

determining a memory address using the read command;

determining that a read operation count for the read command corresponds to the read operation number;

flagging the memory address to have a select gate of the memory address scanned; and scanning the select gate of the memory address in response to flagging the memory address.

2. The method of claim 1, further comprising:

receiving an erase operation from the host device;

determining the erase operation is directed to the flagged memory address; and erasing the memory address in response to determining the memory address, wherein scanning the select gate of the memory address is further in response to erasing the memory address.

3. The method of claim 1, further comprising:

determining that the memory address failed the select gate scan; and retiring the memory address in response to determining that the memory address failed the select gate scan.

4. The method of claim 1, further comprising:

determining that the memory address failed the select gate scan;

determining that a select gate touch-up count does not satisfy a touch-up threshold; and performing a select gate touch-up in response to determining that the select gate touch-up count does not satisfy the touch-up threshold.

5. The method of claim 4, further comprising:

rescanning the select gate of the memory address in response to performing the select gate touch-up.

6. The method of claim 1, further comprising:

determining a read count for the memory subsystem; and determining that the read count satisfies a read count threshold, wherein probabilistically determining the read operation number is further in response to the read count satisfying the read count threshold.

7. The method of claim 6, further comprising:

updating the read operation window size using the read count in response to the read count satisfying the read count threshold.

8. A non-transitory computer-readable storage medium comprising instructions that, when executed by a processing device, cause the processing device to:

retrieve a read disturb scan counter;

determine that the read disturb scan counter satisfies a read disturb scan threshold;

probabilistically determine a read operation number using a read operation window size in response to determining that the read disturb scan counter satisfies the read disturb scan threshold, the read operation number is less than or equal to the read operation window size;

receive, by a memory subsystem, a read command from a host device;

determine a memory address using the read command;

determine that the read command corresponds to the read operation number;

flag the memory address to have a select gate of the memory address scanned; and scan the select gate of the memory address in response to flagging the memory address.

9. The non-transitory computer-readable storage medium of claim 8, wherein the processing device is further to:

receive an erase operation from the host device;

determine the erase operation is directed to the flagged memory address; and erase the memory address in response to determining the memory address, wherein scanning the select gate of the memory address is further in response to erasing the memory address.

10. The non-transitory computer-readable storage medium of claim 8, wherein the processing device is further to:

determine that the memory address failed the select gate scan; and retire the memory address in response to determining that the memory address failed the select gate scan.

11. The non-transitory computer-readable storage medium of claim 8, wherein the processing device is further to:

determine that the memory address failed the select gate scan;

determine that a select gate touch-up count does not satisfy a touch-up threshold; and perform a select gate touch-up in response to determining that the select gate touch-up count does not satisfy the touch-up threshold.

12. The non-transitory computer-readable storage medium of claim 11, wherein the processing device is further to:

rescan the select gate of the memory address in response to performing the select gate touch-up.

13. The non-transitory computer-readable storage medium of claim 8, wherein the processing device is further to:

determine a read count for the memory subsystem; and determine that the read count satisfies a read count threshold, wherein probabilistically determining the read operation number is further in response to the read count satisfying the read count threshold.

14. The non-transitory computer-readable storage medium of claim 13, wherein the processing device is further to:

update the read operation window size using the read count in response to the read count satisfying the read count threshold.

15. A system comprising:

a plurality of memory devices; and a processing device, operatively coupled with the plurality of memory devices, to:

retrieve a read disturb scan counter;

determine that the read disturb scan counter satisfies a read disturb scan threshold;

probabilistically determine a read operation number using a read operation window size in response to determining that the read disturb scan counter satisfies the read disturb scan threshold, wherein the read operation number is less than or equal to the read operation window size;

receive, by a memory subsystem, a read command from a host device;

determine a memory address using the read command;

determine that a read operation count for the read command corresponds to the read operation number;

flag the memory address to have a select gate of the memory address scanned;

receive an erase operation from the host device;

determine the erase operation is directed to the flagged memory address; and erase the memory address in response to determining the memory address; and scan the select gate of the memory address in response to erasing the memory address.

16. The system of claim 15, wherein the processing device is further to:

determine that the memory address failed the select gate scan; and retire the memory address in response to determining that the memory address failed the select gate scan.

17. The system of claim 15, wherein the processing device is further to:

determine that the memory address failed the select gate scan;

determine that a select gate touch-up count does not satisfy a touch-up threshold; and perform a select gate touch-up in response to determining that the select gate touch-up count does not satisfy the touch-up threshold.

18. The system of claim 17, wherein the processing device is further to:

rescan the select gate of the memory address in response to performing the select gate touch-up.

19. The system of claim 15, wherein the processing device is further to:

determine a read count for the memory subsystem; and determine that the read count satisfies a read count threshold, wherein probabilistically determining the read operation number is further in response to the read count satisfying the read count threshold.

20. The system of claim 19, wherein the processing device is further to:

update the read operation window size using the read count in response to the read count satisfying the read count threshold.

* * * * *